April 7, 1959  W. BECK ET AL  2,880,821
ELEVATOR CONTROL SYSTEM
Filed July 2, 1957  7 Sheets-Sheet 1

April 7, 1959

W. BECK ET AL 2,880,821

ELEVATOR CONTROL SYSTEM

Filed July 2, 1957

Inventors
Walter Beck
Henry J. Holuba
By Schroeder, Hofgren, Brady & Wegner
Attorneys April 7, 1959  W. BECK ET AL  2,880,821
ELEVATOR CONTROL SYSTEM
Filed July 2, 1957  7 Sheets-Sheet 3

Inventors
Walter Beck
Henry J. Holuba
By Schrader, Hofgren, Brady & Wegner
Attorneys

W. BECK ET AL 2,880,821

ELEVATOR CONTROL SYSTEM

Filed July 2, 1957

Inventors
Walter Beck
Henry J. Holuba
By Schroeder, Hofgren, Brady & Wegner
Attorneys

United States Patent Office 2,880,821
Patented Apr. 7, 1959

2,880,821

ELEVATOR CONTROL SYSTEM

Walter Beck and Henry J. Holuba, Moline, Ill., assignors to Montgomery Elevator Company, a corporation of Delaware Application July 2, 1957, Serial No. 669,678

34 Claims. (Cl. 187—29)

This invention is concerned with a control system for a multi-car automatic elevator installation.

A principal object of the present invention is to provide a novel automatic elevator control system incorporating several new concepts which contribute to a maximum utilization of the capabilities of the available elevator cars to provide the service desired in a rapid and efficient manner.

One feature of the invention is the provision of means operable under certain conditions for directing the cars to answer only a portion of the cars, with each car being responsive to calls from each floor from a different group of floors and means for changing the groups of floors at which each car will answer calls. Another feature is that each of the cars has a different upper limit, and timing means are incorporated for progressively lowering the upper limit for each of the cars. This effects what may be termed a "sweeping" action of the cars through the building insuring that all floors will be serviced even during periods of heavy load. A further feature is the provision of means operative in the absence of calls from certain floors for accelerating operation of the timing means.

Another feature is the provision of means for counting calls, means responsive to the counting means for initiating a modified form of operation when a predetermined number of calls have been counted and means for maintaining the modified form of operation with a number of calls different from that to initiate the modified operation. Yet a further feature is the provision of a system including means for counting hall calls in one direction, means for counting total hall calls, means for modifying the operation of the cars in a first manner in response to the first counting means and means for modifying the operation of the cars in response to the second counting means. Still another feature is the provision of a normally inoperative counting circuit and timing means for periodically bringing the counting circuit into operation.

A further feature is the provision of a selector for choosing a car to be dispatched from a loading floor, including a plurality of normally inoperative selector circuits, position switch means in each of the circuits, the position switches being closed when the associated car is at the loading floor, normally open selector switch means in each of the circuits, and means for closing the selector switch means in one of the circuits to condition one of the cars at the loading floor for dispatch. Another feature is that a relay is provided in each of the circuits, each relay having switch means associated therewith and connected in the selector circuits of the other cars, to prevent selection of more than one car at a time. Yet a further feature is that selector means includes a time delay and is actuated upon the dispatch of one car so that another car is selected for dispatch after the expiration of the time delay. And another feature is that means are provided for cancelling the selection of a car if it has not departed before the expiration of a predetermined time period following the registration of a call, as if a passenger is standing in the doorway, preventing the doors from closing.

Still a further feature is the provision of a system having a single car selecting and dispatching circuit which may be set to select cars at and dispatch cars from any one of a plurality of floors.

And another feature is the provision of means for terminating travel of cars approaching a loading floor from either direction, selector means for choosing a car to be dispatched from one direction from the loading floor, and means responsive to a call requiring a car to travel from the loading floor other than in response to the choice of selector means to condition the car for such travel from the loading floor. A further feature is the provision, in such a system, of means operable in response to a hall call from the loading floor for selecting a car other than the car selected for dispatch in one direction and conditioning the car for travel in the opposite direction, and means operable in response to a hall call from a floor on the side of the loading floor opposite the direction of dispatch for actuating the loading floor hall call responsive means.

The invention is illustrated in preferred embodiments in the accompanying drawings in which:

Figure 1', comprising portions 1a' and 1b' is a key for Figure 1;

Figure 3' is a key for Figure 3;

Figure 4' is a key for Figure 4;

Figure 5' is a key for Figure 5.

The control system disclosed herein is designed for multiple car operation and, at least for the most part, will be described in connection with a three car installation. The three cars are designated A, B and C; and in certain portions of the circuits relays and contacts associated with the individual cars are identified by the letters of the associated car. The basic controls, including the motor start and braking, car leveling, safeties, car and hall call and door operating circuits and mechanisms will not be described in detail, except insofar as they are involved in or relate to the novel controls with which this application is concerned. These basic controls may be of any suitable nature, so long as they include the mechanisms and perform the functions which are related to the novel controls disclosed herein, as will be described. All relay and timer contacts are shown in the deenergized condition in both the circuit drawings and the keys therefor, regardless of the normal condition of these contacts in operation.

Figure 1A:
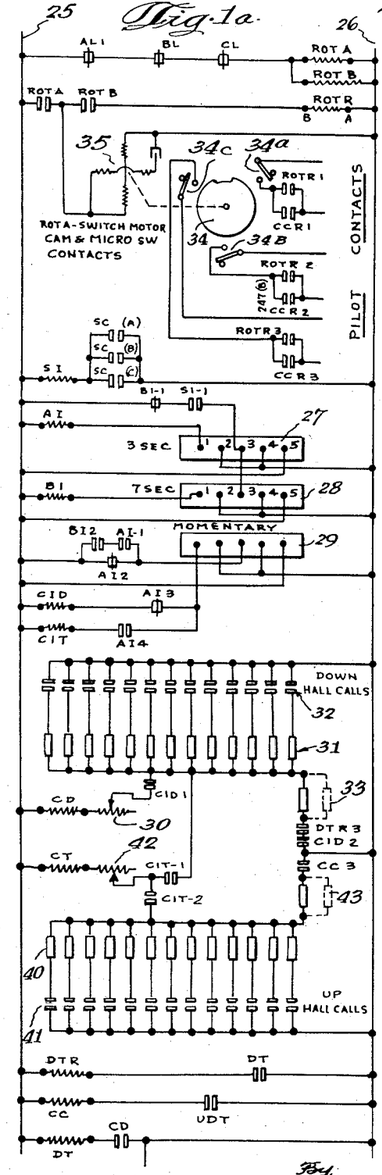
Figure 1, comprising portions 1a and 1b, is an across-the-line schematic diagram of a portion of an elevator control system embodying the invention.
Figure 1B:
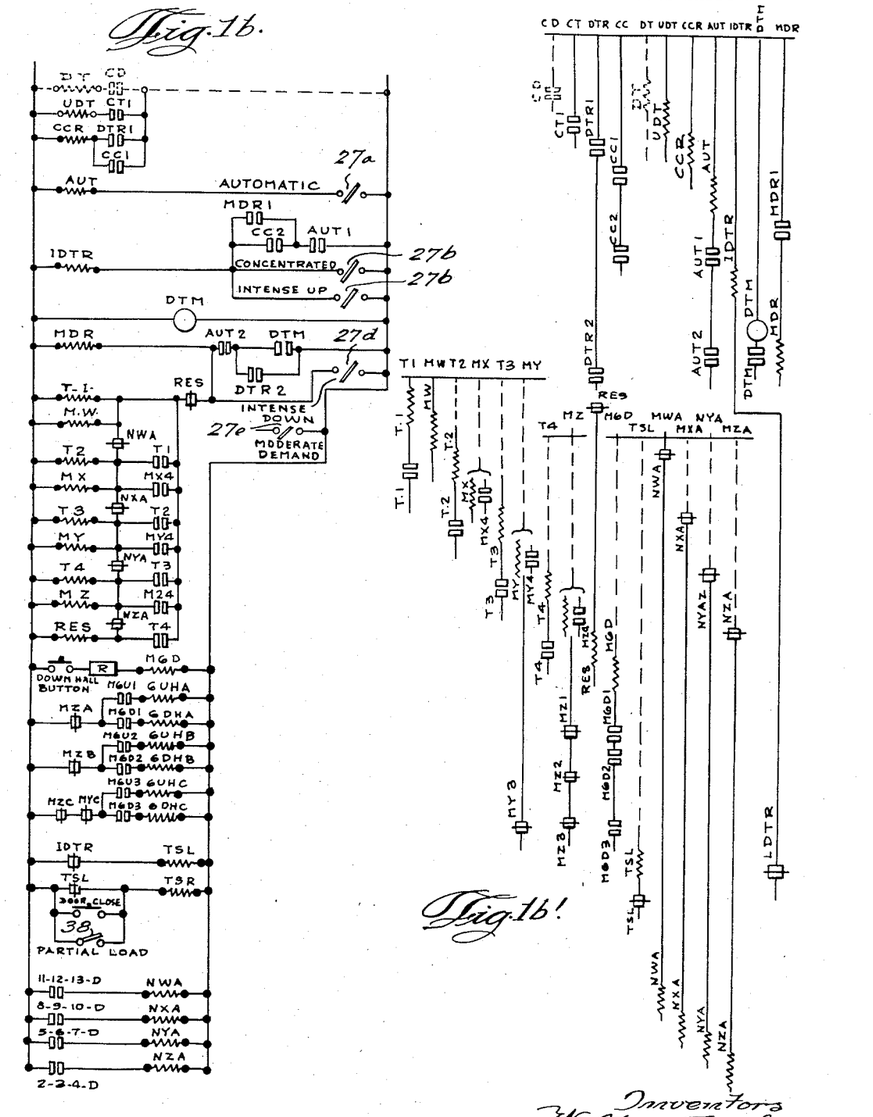
Figure 2:
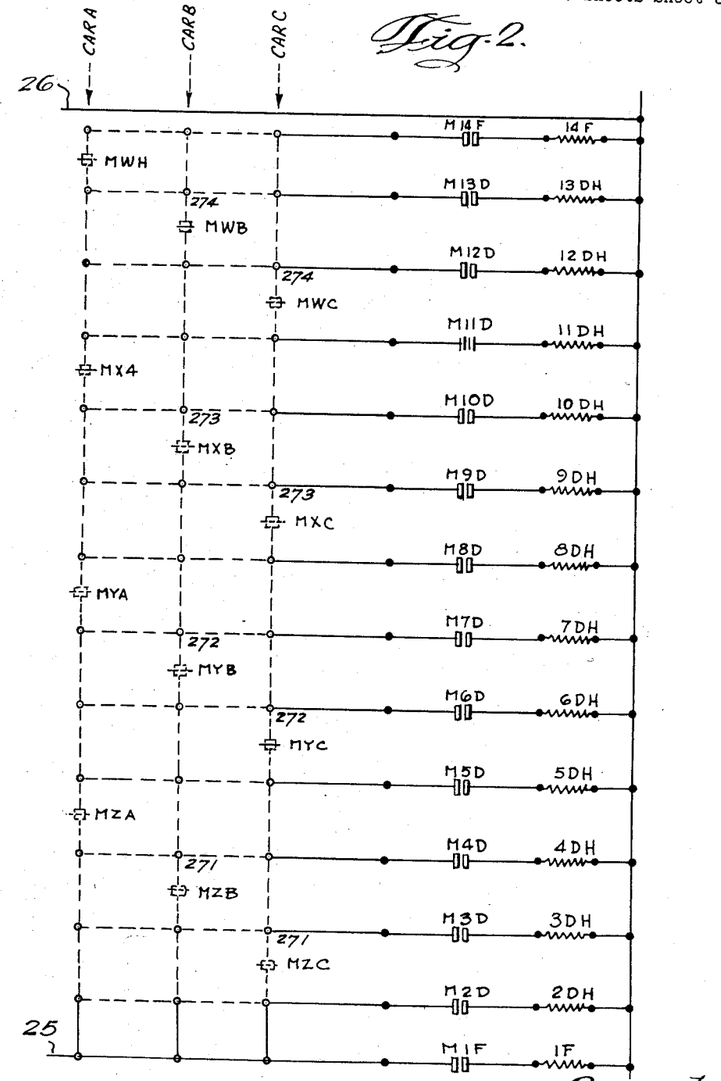
Figure 2 is a diagrammatic representation of a portion of the control circuit.

Figures 1a, 1b and 2 are concerned with a system for controlling the nature of the operation of the cars under certain traffic conditions in order to make the most effective use of the cars and to expedite answering hall calls. The circuit shown is for a fourteen floor building, although it will be understood that this is not essential. The lines 25 and 26 of Figures 1 and 1a, and of Figure 2 are connected to a suitable source of power as 110 volts A.C.

The general nature of the operation of the system is determined by the setting of a manual selector switch including fire sections, 27a, 27b, 27c, 27d and 27e. Section 27a, "Automatic," is in the circuit of AUT, automatic relay; sections 27b and 27c, "Concentrated" and "Intense Up," respectively, are connected in the circuit of IDTR, "intense demand transfer" relay; section 27d, "Intense Down," is in the circuit of MDR, "master down travel station" relay, and of a series of timers and relays which form a part of the circuit for expediting down travel, as will be discussed more fully; and section 27e, "Moderate Demand," completes no circuits, but is merely a position of the selector switch.

In Figure 1b, a representative portion of the hall call registering circuit is shown. When a hall call button is pressed, for example "Down" button 27 on the sixth floor, M6D, "master down" relay for that floor, is energized, closing associated contacts M6D1, M6D2 and M6D3. This in turn completes circuits energizing relays 6DHA, 6DHB and 6DHC, down hall call relays for each of cars A, B and C, respectively. Similarly, if the "Up" hall button (not shown) were pressed a master up relay for that floor would be energized in turn closing contacts M6U1, M6U2 and M6U3, energizing car up relays 6UHA, 6UHB and 6UHC. It will be noted from Figure 1b, that the circuits of the A car relays, 6UHA and 6DHA are completed through contact MZA, the circuits of relays 6UHB and 6DHB are completed through contact MZB and the circuits of relays 6UHC and 6DHC are completed through contacts MZC and MYC.

Turning now to Figure 2 which is a semi-schematic representation of the down hall call relay circuits, the lines 25 and 26 are again shown, connected to a suitable source of power for energizing the circuit. Here only one relay coil as 6DH, and one contact as M6D are shown for each floor, although it will be understood that in practice there is one coil and one contact for each car, for each floor, for both the up and down directions. The circuit for the relay of each car is completed through the appropriate connection, shown in broken lines and labeled car A, car B and car C. For example, relay 6DHA associated with car A is energized through contact MZA, relay 6DHB associated with car B is energized through contact MZB, and relay 6DHC associated with car C is energized through contacts MYC and MZC. Similarly, the up hall call relays, as 6UHA, 6UHB and 6UHC, Figure 1b, are energized through the MZA, MZB, MYC and MZC contacts, although all of the relay coils are not shown, to avoid complication of the drawings. Under certain conditions it is desirable to open the MW, MX, MY and MZ contacts associated with each car in order to prevent the cars from responding to certain of the hall calls which may have been registered. This is done in such a manner that a "cycle of progressive down travel" is set up insuring that down hall calls from the lower floors will be answered. The "cycle of progressive down travel" may be put into operation either automatically or manually as will be described.

Considering first the automatic control, and assuming that selector switch 27a is closed, a pulsed sampling circuit is utilized to check periodically the number of hall calls registered. A timing system is provided to actuate the sampling circuit and utilizes several "impulse start timers," i.e., a timer which requires an impulse to start it, then completes or breaks a desired circuit after a predetermined period of time. Turning now to Figure 1a, and assuming that one of the elevator cars is in operation, as will be the case where a car is answering either a car call or a hall call, or is returning to the terminal floor after having answered such call, one of the contacts SCA, SCB or SCC, associated with the motor generator set start relays (not shown) of the respective cars A, B and C, is closed, completing a circuit for energizing relay SI, "impulse start" relay. This in turn closes contact SI1 completing a circuit through contact BI1 to terminal 3 of both the first and second impulse start timers, 27 and 28 respectively. At the end of a predetermined period, as three seconds, the first impulse start relay 27 times out completing an energization circuit for AI impulse relay, closing contacts AI1 and AI4 and opening contacts AI2 and AI3. After a further period, as four seconds, making a total of seven seconds from the start, the second impulse timer 28 times out completing an energization circuit for BI impulse relay, opening contact BI1 and closing contact BI2. The third impulse timer times out practically immediately completing a circuit through contact AI4 to energize relay CIT, "count impulse total" relay. In the meantime contact BI1 opens breaking the circuit for first and second impulse timers 27 and 28, deenergizing both relays AI and BI. The contacts associated with these relays return to the positions shown in the drawings, completing a circuit through AI3 energizing CID, "count down impulse" relay and opening the circuit of CIT. If one of the SC contacts in the circuit of relay SI is still closed, the cycle of operation of the impulse timers is repeated, again sequentially energizing relays CIT and CID for a short period of time.

Considering first the "count down impulse" relay CID, contact CID1 associated therewith is in a circuit with CD, "count down" relay, an adjustable potentiometer 30 and a group of parallel connected resistors 31, there being one resistor for each of the floors of the building from which a down call may be registered. Connected in series with each of the resistors is a contact 32 which is closed when a down hall call is registered from the associated floor. Thus, when contact CID1 closes, a current will flow through relay CD if one or more down hall calls are registered, and the amplitude of this current will depend on the number of down hall calls registered and the setting of potentiometer 30. If a sufficient number of down hall calls are registered, relay CD is energized; and a circuit is completed through contact CD1 energizing DT, "down total" timer, closing contact DT associated therewith and energizing DTR, "down total" relay. Timer DT is set for a relatively long period of time, as sixty seconds, so that relay DTR is kept energized not only between successive samplings of the down hall calls on energization of CID, but even though all or a large portion of the down hall calls which were registered are answered quickly. This keeps the system from jumping between normal and accelerated down operation, during periods of marginal operation.

When DTR is energized, contacts DTR1, DTR2 and DTR3 all close. Contact DTR2 completes a circuit through AUT2, and normally closed RES contact energizing timer T1 and relay MW to initiate a cycle of progressive down travel. The same result may be achieved by closing "intense down" selector switch 27d.

It will be assumed for the present that contacts NWA, NXA, NYA and NZA are all open. MW relay has associated with it normally closed contacts MWA, MWB and MWC, Figure 2, and when these contacts open, certain hall call relay circuits are broken so that car A will not respond to a hall call from the fourteenth floor, car B will not respond to hall calls from the thirteenth or fourteenth floors and car C will not respond to hall calls from the twelfth, thirteenth or fourteenth floors, although each of the cars will respond to all car calls. When timer T1 has run its cycle, contact T1 associated therewith closes, completing a circuit energizing timer T2 and relay MX, opening contacts MXA, MXB and MXC, Figure 2. This sets up a new, staggered upper limit for the cars A, B and C, in answering hall calls. As timer T2 times out contact T2 closes completing a circuit energizing timer T3 and relay MY, opening contacts MYA, MYB and MYC associated therewith, once again lowering the staggered upper limit for the cars in answering hall calls. When timer T3 runs its cycle, contact T3 closes energizing timer T4 and relay MZ, opening contacts MZA, MZB and MZC and setting up the lowest of the staggered limits for the cars, When timer T4 ends its cycle, contact T4 closes, energizing RES, "reset" timer, which opens contacts RES associated therewith breaking the circuit to each of the relays MW, MX, MY and MZ, and timers T1, T2, T3, T4 and RES resetting the timers and initiating a fresh cycle of progressive down travel after the cars have, for a period of time (governed by RES) accepted all hall calls.

In the foregoing discussion it has been assumed that contacts NWA, NXA, NYA and NZA are open. This will be the case only when there are calls registered from certain groups of the floors: a hall call from one of the floors eleven, twelve or thirteen energizes NWA; a call from floors eight, nine and ten energizes NXA; a call from floors five, six or seven energizes NYA; and a call from floors two, three or four energizes NZA. If there is no call registered from floors eleven, twelve or thirteen contact NWA is closed and timer T2 and relay MX are energized at the start of the cycle of progressive down travel, inasmuch as there is no reason for conditioning cars to service floors eleven, twelve or thirteen. Holding contact MX4 is provided so that if at the start of the cycle, MX is energized as a result of a lack of calls at floors eleven, twelve and thirteen, and such a call is registered before T1 runs its cycle, the opening of contact NWA will not break the circuit to MX. The operation of NXA, NYA and NZA is identical with that of NWA and need not be described in detail.

Once a sufficient number of down hall calls have been registered to initiate operation of the cycle of progressive down travel, provision is made so that a lesser number of down hall calls will maintain this mode of operation. Contact DTR3 is connected in series with a resistor or resistors 33 which are connected in parallel with the bank of resistors 31 and in series with relay CD. The circuit through DTR3 and resistors 33 is completed through CID2 which closes at the same time CID1 closes. Thus, although it may take eight down hall calls to bring the cycle of progressive down travel into operation initially, it may be kept in with, for example, only five down hall calls.

In addition to setting up the cycle of progressive down travel, the energization of CD upon the occurrence of a predetermined number of down hall calls has other effects on the circuit which speed up the operation of the system and increase the rapidity with which calls are answered. Contact DTR1, which is closed when CD is energized (through the operation of relays DT and DTR) completes a circuit energizing CCR, "auxiliary call count" relay. This has an effect in the circuit of the car selector, which will be described only briefly at the present time and will be considered in more detail later.

Basically, the car selector provides for random selection of an available car through the operation of a selector cam 34 driven by a motor 35. Associated with the cam 34 are switches 34A, 34B and 34C, one for each of the cars A, B and C. The selector comes into operation when there is no car selected to leave the loading floor next. This condition is indicated by the closing of the contacts 3AL3, 3BL3 and 3CL3, as will appear later. These contacts are connected in series with "rota-switch" timers ROTA and ROTB. When ROTA has been energized, contact ROTA closes immediately, energizing "rota-switch" motor 35 and timer ROTA holds the rota-switch motor energized for a fraction of a revolution of the cam to insure selection of a different car the next time. Timer ROTB times out shortly after ROTA, closing contact ROTB and energizing ROTR, "rota-switch" relay. This closes contacts ROTR1, ROTR2 and ROTR3 in the circuits of microswitches 34A, 34B and 34C, respectively, so that the next micro switch to close completes a circuit selecting that car for dispatching, if the car is available. Under the conditions of heavy traffic which set up the "cycle of progressive down travel," contacts CCR1, CCR2 and CCR3 in parallel with contacts ROTR1, ROTR2 and ROTR3 are closed by energization of CCR, eliminating the delay of timer ROTB in selecting the next car to be dispatched.

Relay MDR is connected in parallel with the timers T1, T2, T3 and T4 and is likewise energized when DTR2 closes (or when "intense down" selector switch 27d is closed) closing contact MDR1 associated therewith, in the circuit of IDTR, "intense demand transfer" relay. This opens contact IDRT in the circuit of TSL, "load stop" timer. Normally timer TSL requires that the selected car be held at the loading floor for a period of time before the doors close and it leaves, either in response to a car call or a hall call. When contact IDTR is open, TSL never energizes and contact TSL1 in the circuit of TSR, "stop timer" relay, which when energized initiates closing of the doors and dispatch of the car, remains closed. Contact TSL1 in the TSR circuit, when closed, performs the same function as pressing "door close" push-button 37 in the car or the closing of partial load switch 38 which are connected in parallel with it, accelerating the departure of the car. Only a small portion of the last described circuits are shown in Figure 1a in order to explain the ancillary actions of CD. The TSL and TSR circuits are shown in more detail in subsequent drawings and will be discussed later.

Returning now to the call counting circuits, it has been pointed out that relays CID and CIT are energized sequentially at periodic intervals. When relay CIT is energized, contacts CIT1 and CIT2 associated therewith are closed. This connects the bank of down hall call resistors 31 in parallel with a similar bank of up hall call resistors 40, one for each floor and each connected in series with a relay contact 41 which is closed when an up hall call is registered from that floor. The parallel combination of down hall call and up hall call resistors is connected in series with CT, "count total" relay and potentiometer 42. When a sufficient number of up and down hall calls are registered, as determined by the setting of potentiometer 42, relay CT is energized, closing contact CT1 and energizing relay UDT, "up-down total" timer. Timer UDT is similar in function to "down" timer DT, in that it energizes CC, "call count" relay, and keeps it energized for a period of time between periodic call counts and even though the number of total hall calls may temporarily be insufficient to maintain CT energized, preventing the special operation to be described from being initiated and terminated rapidly. Associated with relay CC are three sets of contacts. CC1 is in parallel with DTR1 in the circuit of CCR, "auxiliary call count" relay, which has three sets of contacts in parallel with ROTR1, ROTR2 and ROTR3, eliminating the time delay of ROTB in the selection of a car to be dispatched by the rota-selector. Contact CC2 is in parallel with MDR1 in the circuit of IDTR, "intense demand transfer" relay, which as just described, eliminates the time delay at the loading station normally obtained through the operation of TSL. CC3 is connected in series with one or more resistors 43 in parallel with the up hall call resistors 40, reducing the number of hall calls necessary to maintain CT energized after it has once been brought into operation.

A program timer DTM has a contact DTM connected in parallel with contact DTR2 and may be set to initiate a period of accelerated down operation at predetermined times, depending on the nature of the building.

Figure 3:
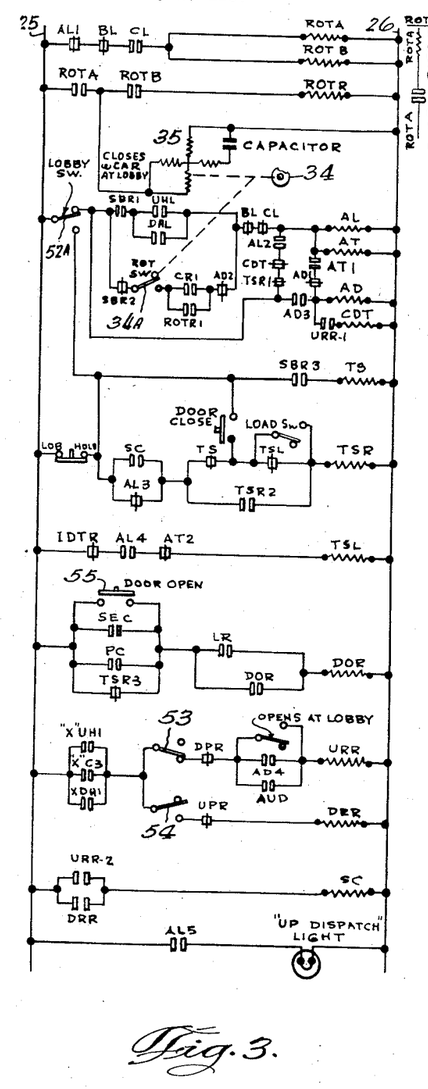
Figure 3 is an across-the-line diagram of another portion of the control circuit.

Turning now to Figure 3, the circuit and operation of the rota-selector in selecting and dispatching cars from the loading floor will be described. Some portions of the circuit shown in Figure 3 necessarily duplicate or disclose in more detail circuits shown only in part in Figures 1a and 1b.

Except for the rota-selector timers ROTA, and ROTB, relay ROTR and motor 35, the circuitry in Figure 3 is individual to each car. In the case of the circuits associated with the rota-selector itself, the relays are related to the cars A, B and C by the letters A, B and C as a part of the relay designation. The circuit shown in Figure 3 is for car A and the circuits associated with cars B and C are identical except for the letter designation of certain of the relays and contacts as will readily be apparent as the description of the circuit progresses. In addition, certain contacts in the "A" car circuit are operated by relays in the "B" or "C" car circuits.

As discussed in connection with Figure 1, when none of the three cars of the system, in a three car system, has been selected for service and is waiting to be dispatched from the loading floor, contacts AL1, BL and CL are closed completing an energization circuit for ROTA and ROTB, "rota-switch" timers. ROTA closes contact ROTA and energizes "rota-switch" motor 35 to drive "rota-switch" cam 34. A few seconds later timer ROTB times out closing contact ROTB and energizing ROTR, "rota-switch" relay.

Lobby switch 52A, associated with car A, is in the position shown when the car A is at the loading floor, in this case, the lobby. Contact SBR2 is closed when car A is stopped. Assuming that rota-switch cam 34 closes switch 34A, of the "A" car circuit, and further assuming that either ROTR1, associated with rota-switch relay ROTR, or CCR1, associated with the auxiliary call count relay, is closed, as explained in connection with Figures 1a and 1b, a circuit is completed through AD2, BL and CL energizing AL, "A" car "loading" relay, and AT, "A" car "travel" timer. The BL and CL contacts prevent the selection of car A if either car B or car C has previously been selected and had not yet left the loading floor. Similar contacts associated with the AL relay are in the circuits of BL and CL relays.

An auxiliary car selection circuit for energizing AL and AT is provided which, during periods of low traffic when one or two of the cars are standing with their power off, enables reselection of the previously dispatched car if it returns to the loading or lobby floor before ROTR is energized. This auxiliary circuit is completed through SBR1, which is closed when the car is running, lobby switch 52A, which closes as the car comes into the lobby floor and either UHL or DHL, depending on the direction in which the car is traveling.

When relay AL is energized, several circuits are affected: contact AL1 in the circuit of ROTA and ROTB is opened deenergizing the rota-selector; contact AL2 closes completing a holding circuit for AL and AT through contacts CDT and TSR1, as the inertia of the rota-selector mechanism and/or the time on ROTA will carry the cam 34 on past the position for closing switch 34a; contact AL3 in the circuit of TSR, stop timer relay, opens; and contact AL4 closes completing a circuit to TSL, "load stop" timer, readying it for the timing cycle and opening contact TSL in the circuit of TSR. This assumes that IDTR is closed as is the case except when the system is conditioned for intense operation as when MDR1 or CC2, Figure 1b, is closed. Contact AL5 closes lighting the "up dispatch" light, associated with car A, indicating that it is the next car to leave the loading floor. After a short time, timer AT times out closing contact AT1 and completing a circuit for energizing AD, "dispatch" relay; contact AT2 in the circuit of TSL opens starting the "load stop" time. Contacts AD1 and AD3 associated with relay AD, reverse their connections breaking the initial energization circuit for AD, through AT1, and completing a holding circuit directly through lobby switch 52A; while contact AD2 opens the initial selector energization circuit for AL and AT.

Contact AD4 also closes, in the circuit of URR, "up direction" relay. Assuming that there is either a hall call or a car call for a floor to be serviced by the elevator, a contact as XUH1 or XDH1, for hall calls, or XC3 for a car call, will close completing a circuit through up direction selection switch 53, energizing URR. With URR energized, contact URR2 closes energizing SC, motor generator start relay, in turn closing contact SC in the circuit of TSR.

Returning now to a consideration of the TSR circuit, contact TS will be closed, as the TS timer has already timed out rapidly when the car reached the floor, on the opening of SBR3, providing only for the entry or exit of a passenger; the normal function of TS is to provide a stop time at a floor other than the loading floor. As soon as timer TSL runs its cycle, after the opening of AT2, contact TSL closes, completing the energization circuit for TSR, which is then held in by closing of TSR2, a holding contact connected across contacts TS and TSL. Contact TSR3 opens in the circuit of DOR, "door open" relay, deenergizing the relay and permitting the car doors to close. Of course, if "door open" switch 55 is pressed, or if one of the safeties, as the sensitive edge contact SEC or photocell contact PC is closed, DOR remains energized preventing the door from closing. As soon as the doors close the car is dispatched to answer the registered call.

Contact URR1 is connected in the circuit of CDT, "cancel dispatch" timer. This contact closes when URR is energized, i. e., as soon as a hall call, or car call from the selected car, is registered. If for some reason the selected car is unable to leave, as if the door open switch 55 is held down or someone is standing in the door, closing either or both of contacts SEC and PC, CDT will time out opening its contacts CDT in holding circuit for AL. When this occurs the car is left standing in condition to leave as soon as the obstruction to its departure is cleared, as URR is still energized. However, the circuit for ROTA and ROTB is once again completed, by closing AL1, and the rota-selector once again comes into operation to select a new car for dispatching. Thus if for some reason a passenger is standing in the doorway of the car the entire system is not tied up indefinitely.

Figure 4:
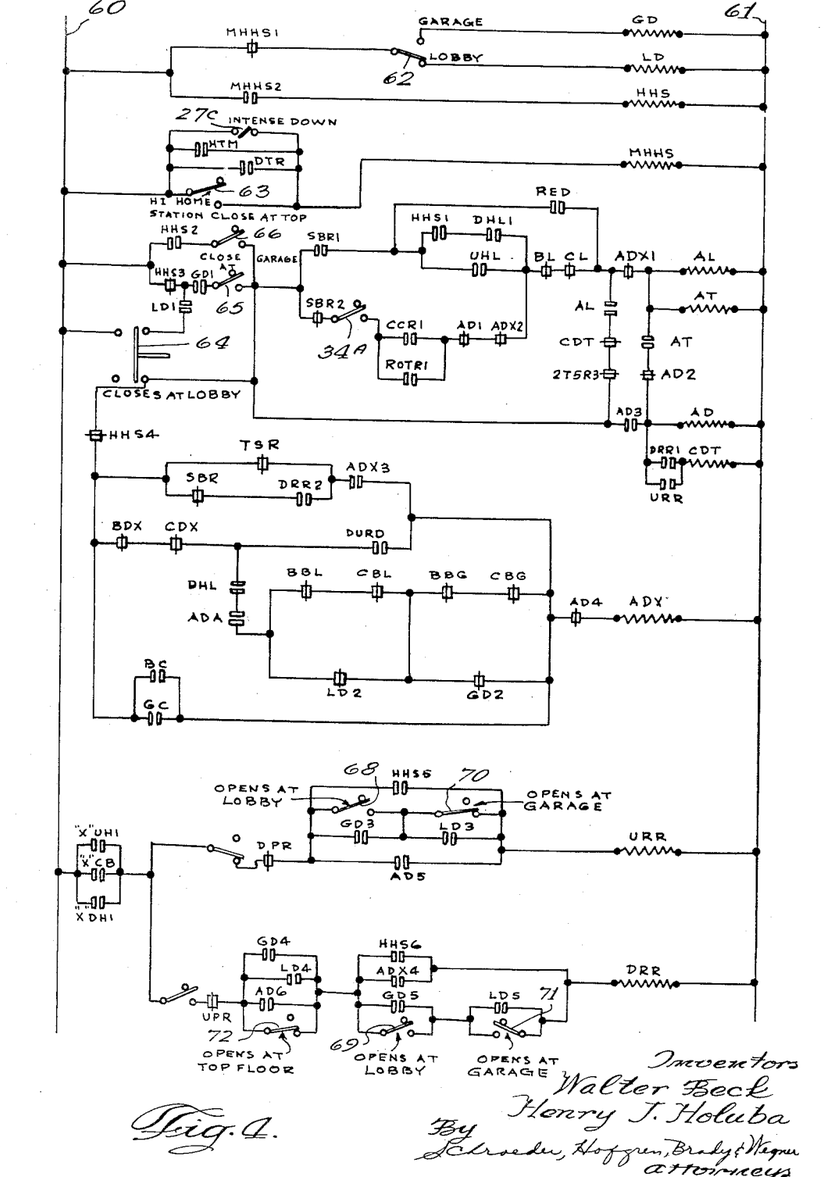
Figure 4 is an across-the-line diagram of a modification of Figure 3.

In some installations it is desirable to provide for dispatching the cars from other than the lobby or main floor of the building and to permit manual or automatic selection of the floor to be used for dispatch. In Figure 4 a system is illustrated for a building having two floors, as a garage and a basement, below the lobby, with circuitry for dispatching cars either from the lobby, the garage or the top floor. The leads 60 and 61 are connected to a suitable source of power as 110 volts A.C. Again, as in Figure 3, the circuit shown is for car A of a three car system and it will be understood that certain portions of the circuit are identical, except for contact designations, with the circuits for cars B and C.

The selection of the desired mode of operation may be achieved manually as follows. Assuming MHHS, "master high home station" relay, is not energized, as is the condition shown in the drawing, contact MHHS1 is closed and garage or lobby dispatch may be selected through the operation of switch 62, which normally will be provided at the control panel in the lobby. Through this switch either LD, "lobby dispatch," or GD, "garage dispatch," relays are energized. When relay MHHS is energized, contacts MHHS1 and MHHS2 reverse positions opening the circuit to relays GD and LD and energizes HHS, "high home station" relay. This may be accomplished in a variety of ways, by closing one of the following: switch 63, "high home station" switch on the controller's panel; "Intense Down" manual control switch 27c; contact DTR associated with DTR, "down total" relay, Figure 1; or contact HTM, associated with HTM, "high home station timer" a program timer for preselection based on known daily traffic patterns.

The circuitry associated with the rota-selector is generally the same as that in a single car installation illustrated in Figure 3. There are, however, a few differences and the circuit will be described briefly with the emphasis on these differences.

Again, the rota-selector motor will operate at any time a car has not been selected for dispatching, i.e., when relay contacts AL1, BL and CL are closed (Figures 1 and 3). Three parallel paths are provided for energizing the individual car selector circuits, one of which will be used depending on the level from which dispatching is to take place. If the cars are to be dispatched from the lobby, the circuit will be completed through contacts HHS3, LD1 and switch 64, which closes when the car associated therewith reaches the lobby. For garage dispatch the circuit is completed through contact HHS3, GD1 and switch 65 which closes when the associated car reaches the garage. For high home station operation contact HHS3 opens, HHS2 closes and the circuit is completed through HHS2 and switch 66 which closes when the car reaches the top floor. As in the circuit of Figure 3, the primary selection, when no car is in operation, is achieved on closing switch 34a by the rota-selector cam, completing a circuit through one of the contacts CCR1 or ROTR1, depending upon the particular condition of the system, AD1, ADX2, BL, CL and ADX1, energizing AL and AT. With the exception of the ADX contacts, this portion of the circuit is identical with that of Figure 3 and the operation and functions of AL, AT, AD and CDT are the same. As will be discussed subsequently, ADX, "down dispatch" relay for car A, is energized under certain conditions as the car comes into or is standing at the lobby floor to send it on down to the garage or basement. When this occurs, contacts ADX1 and ADX2 in the selector circuit open, preventing the selection of car A by the rota-selector.

The returning car is selected to be next dispatched, as was done in the circuit of Figure 3, from the lobby or garage floor through SBR1 and UHL. If the high home station relay is energized and dispatching is from the top floor, this circuit is completed through HHS1 and DHL1. If a car has been at a floor below the loading floor and a passenger has pressed a car call button for a floor above the loading floor, contact RED is closed. Then as the car comes into the loading floor a circuit is completed through SBR1, RED and ADX1 energizing AL and AT to redispatch that car to complete the car call, even though one of the other cars has been selected for dispatch by the rota-selector. The DOR, TSL, TSR and TS circuits are substantially identical with those of Figure 3 and are not shown here.

Turning now to the circuits of URR and DRR, the up and down direction relays, it will be assumed first that the system is set for lobby dispatch. In this situation, contact LD3 in the circuit of URR is closed, as are contacts LD4 and LD5 in the circuit of DRR. When the car is selected for dispatch from the lobby, AD closes energizing URR if a hall or car call has closed "X"UH1, "X"DH1 or "X"CB, as described in connection with Figure 3. When the car is returning from a call, switch 68 opens in the lobby breaking the circuit for URR. When the car is at an upper floor traveling in a down direction under the control of DRR, but still on lobby dispatch, a circuit is completed through LD4, switch 69, which opens at the lobby, and LD5, keeping DRR energized until the car reaches the lobby. If the car should be selected to travel downwardly, energizing ADX as will be described, the circuit remains completed through ADX4, even though switch 69 may have opened.

Assuming now that the system is set for garage dispatch, the car is again conditioned for up travel by energizing URR through AD5. URR is maintained energized through GD3 and switch 70, which opens only at the garage. For garage dispatch with the car traveling in the downward direction, DRR is maintained energized by a circuit including GD4, GD5 and switch 71, which opens at the garage.

For high home station operation, with the car conditioned to travel in the up direction URR is maintained energized through HHS5. When the car is standing at the top floor waiting to be dispatched, DRR is energized by a circuit including AD6, as switch 72 is opened, and HHS6.

Turning now to a consideration of the ADX circuit, this relay performs two major functions: the first is to prevent selection of the car at the lobby floor, if for some reason it is desirable that it travel on to a lower floor, as the garage or basement; and secondly to maintain DRR energized to permit the car to travel in a downward direction. It should be noted at the outset that the ADX circuit is not in use when HHS is energized as HHS4 is opened. In this situation the ADX circuit is not necessary as there is no problem of preventing selection of the car for dispatch from the top floor.

Consider first the situation where a car descending from an upper floor has a car call for either the garage or basement. In this case contacts GC or BC, associated with the garage call and basement call relays respectively, will be closed, depending on whether the call is for the garage or basement. A circuit is completed through AD4 energizing ADX as the car approaches the lobby. Contact AD4 prevents the energization of ADX if the car has been standing at the loading floor and selected for "up" dispatch, in which case the "up" light will be on in front of the car and a passenger should not enter it to travel downwardly. A holding circuit for relay ADX is set up through contact ADX3.

If a hall call is received from a floor below the loading floor, DHL and ADA close completing a circuit energizing ADX under certain circumstances. If the system is on lobby dispatch LD2 is open and ADX will only be energized if both contacts BBL and CBL are closed. These contacts open only if the car B or C happens to be below the lobby and if this should be the case, the car which is so located could answer the hall call. When the system is on garage dispatch, GD2 is open and if car B or C is below the garage, BBG or CBG is open, again preventing the system from energizing ADX and allowing car B or C to answer the call.

If the car should be sitting at the lobby floor with the door closed, not selected for "up" dispatch and a prospective passenger at a lower floor pushes the hall button or a person at the lobby floor pushes the down button, relay DORD (Figure 5) is energized, closing contact DORD3 and energizing ADX.

Energization of relay ADX opens contacts ADX1 and ADX2, preventing selection of car A for an up trip by the rota-selector; and closes contact ADX4 in the circuit of DRR.

Figure 5:
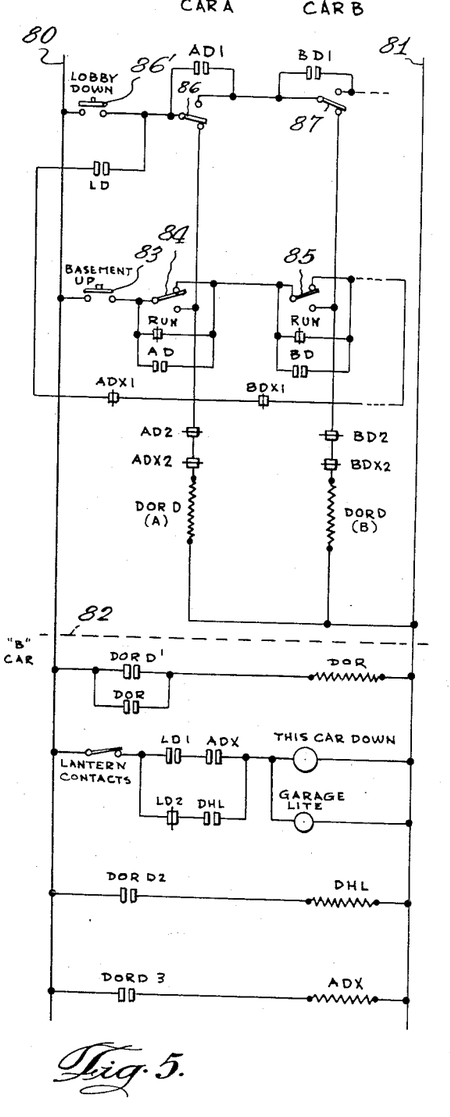
Figure 5 is an across-the-line diagram of another portion of the control circuit.

In Figure 5, a circuit is shown which provides another facet of service for answering hall calls from floors below the lobby, when the system is set for lobby dispatch. It is particularly designed for periods of low travel, as late at night. The situation then often is that a car has been selected for "up" dispatch by the rota-selector and is sitting in the lobby with its doors open and the "up" light it. The selected car will, of course, remain in this condition until a hall or car call is received which will cause it to leave. If a hall call is received from a lower level it is desirable to send a car other than the one which has been selected for "up" dispatch to answer it, as this eliminates the need for readjusting the selected car for down travel and then choosing another car for "up" dispatch. Referring now more particularly to the drawing of Figure 5, where a two car system is illustrated, the lines 80 and 81 are connected to a source of power as 110 volts A.C. The relay contacts shown in Figure 5 have the same letter, but not the same numeral designation as in other figures. The circuits at the top of Figure 5 are common to the entire system, while the circuits below the transverse broken line 82 relate only to car B.

When the basement "up" button 83 is pressed, a circuit is completed through car position switches 84 and 85, contacts BDX1, ADX1, which will open if a car has been selected for down dispatch, and LD which will be closed as the system is on lobby dispatch. Assuming that car A has been selected for dispatch by the rota-selector, AD1 is closed. The same result would be achieved electrically if the car A were not at the lobby floor in which case car position switch 86 would be in the position opposite that in which it is shown in the drawing. Contact AD2 is, of course, open preventing energization of DORD–A. A circuit is completed, however, through car position switch 87, BD1 and BDX2 energizing DORD–B.

The contacts associated with DORD–B perform several functions. DORD1 in the circuit of relay DOR closes, energizing DOR, opening the doors of the car and starting the operation of stop timer TS, Figure 3. At the same time, DORD3 closes energizing relay ADX, Figure 4, which in turn closes contact ADX completing a circuit through 2LD1 lighting the car "down" light. After timer TS (Figure 3) has run its cycle, the doors close and the car answers the basement call. It will be noted that this circuit makes use of the circuitry involved if a prospective passenger should push the lobby down switch 86, and the system reacts in exactly the same manner. In addition to simplifying the operation of the system by preventing the reassignment of a car previously selected by the rota-selector to travel up, this system provides a certain amount of activity at the elevators in the lobby: the doors open, the "down" light comes on and the doors close before the car leaves; alerting the desk clerk to the fact that someone will be coming up from a lower level. This is particularly desirable during the early morning hours.

The foregoing detailed description is given for clearness of understanding only, and no unnecessary limitations should be understood therefrom, for some modifications will be obvious to those skilled in the art.

We claim:

1. In a control system for a plurality of automatic elevator cars serving a multi-floor building, apparatus comprising: means for registering calls; means for conditioning said cars to answer only calls from a group of floors with each car being responsive to calls from a different group, each group being composed of a plurality of floors; and means for periodically conditioning each car to answer calls from a group of floors different from the group at which it first answers the calls.

2. In a control system for a plurality of automatic elevator cars serving a multi-floor building, apparatus comprising: means for registering hall calls; means for conditioning said cars to answer only hall calls from a group of floors with each car being responsive to calls from a different group, each group being composed of a plurality of floors different in number from each other group; and timing means for periodically conditioning each car to answer calls from a group of floors different from the group at which it first answers the calls.

3. In a control system for a plurality of automatic elevator cars serving a multi-floor building, apparatus comprising: means for registering hall calls; means for conditioning said cars to answer only calls from a group of floors with each car being responsive to calls from a different group, each group being composed of a plurality of floors, and having a different upper limit; and timing means for periodically conditioning each car to answer calls from a group of floors different from the group at which it first answers the calls, progressively lowering the upper limit for each of said cars.

4. In a control system for a plurality of automatic elevator cars serving a multi-floor building, apparatus comprising: means for registering hall calls; means for conditioning said cars to answer registered hall calls, and including a plurality of normally inoperative circuits, each circuit when operated providing a different upper limit for each car and conditioning the car to answer hall calls from the group of floors below said upper limit; and means for sequentially rendering said circuits operative, periodically conditioning each car to answer calls from a group of floors different from the group at which it first answers the calls, progressively lowering the upper limit for each of said cars.

5. In a control system for a plurality of automatic elevator cars serving a multi-floor building, apparatus comprising: means for registering hall calls; means for conditioning said cars to answer only hall calls from a group of floors with each car being responsive to calls from a different group, each group being composed of a plurality of floors different in number from each other group; timing means for periodically conditioning each car to answer calls from a group of floors different from the group at which it first answers the calls; and means operative in the absence of calls from certain floors for accelerating operation of said timing means.

6. Apparatus of the character described in claim 4, including a separate timer for rendering each of said circuits operative, each timer being actuated when the preceding circuit is rendered operative.

7. In a control system for a plurality of automatic elevator cars serving a multi-floor building, apparatus comprising: means for establishing one form of operation of said cars; means for registering calls; means for counting at least a portion of said calls; means responsive to said counting means for initiating a modified form of operation when at least a predetermined number of calls have been counted; and means for maintaining said modified form of operation with a number of calls different from that required to initiate said modified form of operation.

8. Apparatus of the character described in claim 7, wherein said modified form of operation is maintained with a lesser number of calls than is required to initiate it.

9. In a control system for a plurality of automatic elevator cars serving a multi-floor building, apparatus comprising: means for registering hall calls; means for periodically sampling the down hall calls; means responsive to said sampling means for conditioning said cars to answer only calls from a group of floors with each car being responsive to calls from a different group, each group being composed of a plurality of floors; and means for periodically conditioning each car to answer calls from a group of floors different from the group at which it first answers the calls.

10. In a control system for a plurality of automatic elevator cars serving a multi-floor building, apparatus comprising: means for establishing one form of operation of said cars; means for registering hall calls; means for counting hall calls in one direction; means for counting total hall calls; means for modifying the operation of said cars in a first manner, in response to said first counting means; and means for modifying the operation of said cars in a second manner in response to said second counting means.

11. Apparatus of the character described in claim 10, wherein actuation of said second mentioned operation modifying means prevents actuation of the first mentioned operation modifying means.

12. In an automatic elevator system for a plurality of elevator cars serving a multi-floor building, means for sampling traffic, comprising: means for registering hall calls from said floors; means for directing said cars to answer said registered calls; a normally inoperative circuit for counting unanswered registered hall calls; timing means for periodically bringing said counting circuit into operation; and means responsive to said counting circuit for modifying the operation of said cars.

13. In an automatic elevator system for a plurality of elevator cars serving a multi-floor building, means for sampling traffic, comprising: means for registering hall calls from said floors; means for directing said cars to answer said registered calls; a normally inoperative circuit for counting unanswered registered hall calls; timing means for periodically bringing said counting circuit into operation; a relay actuated by said counting circuit when at least a predetermined number of calls are registered; timer means actuated by said relay and having a period greater than the period of said timing means; means actuated by said timer means for altering the circuit of said relay to permit actuation by a lesser predetermined number of calls; and means responsive to said counting circuit for modifying the operation of said cars.

14. Apparatus of the character described in claim 13, wherein said counting circuit includes a plurality of parallel connected resistors, each associated with a floor and connected in series with a contact associated with said hall call registering means, and a relay connected in series with said resistors and call contacts.

15. In an automatic elevator system for a plurality of elevator cars serving a multi-floor building, means for sampling traffic, comprising: means for registering hall calls; from said floors; means for directing said cars to answer said registered calls; a first normally inoperative circuit for counting registered hall calls in one direction; a second normally inoperative circuit for counting total hall calls; a first timer; a second timer connected in parallel with said first timer and having a long timing period; a third timer operable as a function of the first and second timers for periodically energizing said first and second counting circuits sequentially; means for modifying the operation of said cars in a first manner, in response to said first counting means; and means for modifying the operation of said cars in a second manner in response to said second counting means.

16. In a control system for a plurality of automatic elevator cars, means for selecting a car to be dispatched from a loading floor, comprising: a plurality of normally inoperative circuits, one for each car, each circuit including means for conditioning the associated car for dispatch from the loading floor; position switch means in each of said circuits, said switch means being closed when the associated car is at the loading floor; normally open selector switch means in each of said circuits; and means for closing the selector switch means in one of said circuits to render operative the conditioning circuit for one of the cars at the loading floor.

17. In a control system for a plurality of automatic elevator cars, means for selecting a car to be dispatched from a loading floor, comprising: a plurality of normally inoperative circuits, one for each car, each circuit including means for conditioning the associated car for dispatch from the loading floor; position switch means in each of said circuits, said switch means being closed when the associated car is at the loading floor; normally open selector switch means in each of said circuits; means for closing the selector switch means in one of said circuits to render operative the conditioning circuit for one of the cars at the loading floor; and means for preventing selection of more than one car at a time.

18. In a control system for a plurality of automatic elevator cars, means for selecting a car to be dispatched from a loading floor, comprising: a plurality of normally inoperative circuits, one for each car, each circuit including means for conditioning the associated car for dispatch from the loading floor; position switch means in each of said circuits, said switch means being closed when the associated car is at the loading floor; a normally open selector switch in each of said circuits; and means for closing said selector switch means one at a time in a predetermined sequence.

19. In a control system for a plurality of automatic elevator cars, means for selecting a car to be dispatched from a loading floor, comprising: a plurality of normally inoperative circuits, one for each car, each circuit including means for conditioning the associated car for dispatch from the loading floor; position switch means in each of said circuits, said switch means being closed when the associated car is at the loading floor; a normally open selector switch in each of said circuits; a selector motor; circuit means for energizing said selector motor and including series connected switch means; a relay in each of said conditioning circuits for opening said series connected switch means as the conditioining circuit is rendered operative, whereby said motor is energized only when no car is selected for dispatch; and a selector cam driven by said motor for operating said selector switches to render operative the conditioning circuit for one of the cars at the loading floor.

20. In a control system for a plurality of automatic elevator cars, means for selecting a car to be dispatched from a loading floor, comprising: a plurality of normally inoperative circuits, one for each car, each circuit including means for conditioning the associated car for dispatch from the loading floor; position switch means in each of said circuits, said switch means being closed when the associated car is at the loading floor; normally open selector switch means in each of said circuits; selector means for closing said selector switch means to render operative the conditioning circuit for one of the cars at the loading floor; time delay means for rendering said selector means operative; and circuit means rendered operative on dispatch of a car for energizing said time delay means.

21. In a control system for a plurality of automatic elevator cars, means for selecting a car to be dispatched from a loading floor, comprising: a plurality of normally inoperative circuits, one for each car, each circuit including means for conditioning the associated car for dispatch from the loading floor; position switch means in each of said circuits, said switch means being closed when the associated car is at the loading floor; normally open selector switch means in each of said circuits; selector means for closing said selector switch means to render operative the conditioning circuit for one of the cars at the loading floor; time delay means for rendering said selector means operative; circuit means rendered operative on dispatch of a car for energizing said time delay means; and auxiliary means for selecting a previously dispatched car if it returns before the expiration of the delay period of said time delay means.

22. In a control system for a plurality of automatic elevator cars, means for selecting a car to be dispatched from a loading floor, comprising: a plurality of normally inoperative circuits, one for each car, each circuit including means for conditioning the associated car for dispatch from the loading floor; position switch means in each of said circuits, said switch means being closed when the associated car is at the loading floor; normally open selector switch means in each of said circuits; time delay switch means connected in series with said normally open selector switch means; means for closing said selector switch means to render operative the conditioning circuit for one of the cars at the loading floor; and an auxiliary circuit in parallel with said time delay and selector switch means and closed when the associated car is in operation, to select a previously dispatched car if it returns before the expiration of the timing period of said time delay switch means.

23. In a control system for a plurality of automatic elevator cars, means for selecting a car to be dispatched from a loading floor, comprising: a plurality of normally inoperative circuits, one for each car, each circuit including means for conditioning the associated car for dispatch from the loading floor; position switch means in each of said circuits, said switch means being closed when the associated car is at the loading floor; selector means for conditioning one of the cars at said loading floor to be next dispatched; means for registering a call; means responsive to said call registering means for conditioning the selected car for dispatch; timing means, the operation of which is initiated upon registration of a call; and means for cancelling selection of said car if it has not departed before the expiration of the period of said timing means.

24. In a control system for a plurality of automatic elevator cars, apparatus comprising: means for selecting one of said cars to be dispatched from a loading floor; means for registering calls; means responsive to the registration of a call for causing said selected car to be dispatched; safety means for preventing said car from departing; a timer initiated by the registration of said call; and means actuated by said timer for cancelling selection of said car if it has not departed, conditioning said circuit to select another car for dispatch.

25. In a control system for a plurality of automatic elevator cars, means for selecting a car to be dispatched from one of a plurality of loading floors, comprising: a plurality of normally inoperative circuits, one for each car, each circuit including means for conditioning the associated car for dispatch from a loading floor; a plurality of car position switch means in each of said circuits, one switch for each of the loading floors, the switch means being closed when the associated car is at the respective floor; means for selecting the loading floor to be used and including switch means in series with said car position switch means; normally open selector switch means in each of said selector circuits; and means for closing said selector switch means to render operative the conditioning circuit for one of the cars at the selected loading floor.

26. In a control system for a plurality of automatic elevator cars, means for selecting a car to be dispatched from one of a plurality of loading floors, comprising: means for selecting cars to be dispatched from a selected one of said loading floors; a car direction control circuit associated with each of said cars and including direction relay means; car position switch means in said direction control circuit which open at the various loading floors; loading floor selector means; and switch means associated with said loading floor selector means and interconnected with said car position switch means in the direction control circuit, to condition each of said cars to return to the floor from which cars are being dispatched.

27. In a control system for a plurality of elevator cars serving a plurality of floors with a loading floor at an intermediate level, apparatus comprising: means for terminating travel of cars approaching said loading floor from either direction; selector means for choosing a car to be dispatched in one direction from said loading floor; and means responsive to a call requiring a car to travel from said loading floor other than in response to the choice of said selector means, to condition such car for travel from the loading floor.

28. In a control system for a plurality of elevator cars serving a plurality of floors with a loading floor at an intermediate level, apparatus comprising: means for terminating travel of cars approaching said loading floor from either direction; selector means for choosing a car to be dispatched in one direction from said loading floor; a circuit associated with each car and including a relay responsive to a car call requiring the car to travel past the loading floor in a direction opposite to the direction in which cars are dispatched; means responsive to said relay for breaking the dispatch conditioning circuit for said car; and means responsive to said relay for maintaining said car in condition for travel in a direction opposite the direction in which cars are dispatched.

29. In a control system for a plurality of elevator cars serving a plurality of floors with a loading floor at an intermediate level, apparatus comprising: means for terminating travel of cars approaching said loading floor from either direction; selector means for choosing a car to be dispatched in one direction from said loading floor; a circuit associated with each car and including means responsive to a car call in a car on the side of said loading floor opposite the direction in which cars are dispatched, requiring the car to travel past the loading floor and including a relay; and a contact associated with said relay and connected in the selector means for said car for effecting immediate selection and dispatch of said car upon its arrival at said loading floor.

30. In a control system for a plurality of elevator cars serving a plurality of floors with a loading floor at an intermediate level, apparatus comprising: means for terminating travel of cars approaching said loading floor from either direction; selector means for choosing a car to be dispatched in one direction from said loading floor; circuit means including a relay having contacts in said dispatch conditioning circuit, for preventing selection of a car for dispatch in said one direction, to permit the car to answer a call in the other direction; first means for energizing said relay in response to a car call for a floor on the side of said loading floor opposite the direction in which cars are dispatched; second means for energizing said relay in response to a call at said loading floor for service to a floor in said opposite direction; and third means for energizing said relay in response to a hall call from a floor on said opposite side of said loading floor.

31. Apparatus of the character described in claim 30, including contact means open when a car is at a floor on said opposite side of the loading floor, to prevent energization of the relay for another car in response to a hall call from a floor on said opposite side of the loading floor.

32. In a control system for a plurality of elevator cars serving a plurality of floors with a loading floor at an intermediate level, apparatus comprising: means for returning cars to said loading floor; means for selecting a car at said floor and conditioning it for dispatch in one direction; means operable in response to a hall call from said loading floor for selecting a car other than the car selected for dispatch in said one direction and conditioning said car for travel in the opposite direction; and means operable in response to a hall call from a floor on the side of the loading floor opposite the direction of dispatch for actuating said loading floor hall call responsive means for selecting and conditioning a car to answer said hall call.

33. In a control system for a plurality of elevator cars serving a plurality of floors with a loading floor at an intermediate level, apparatus comprising: means for returning cars to said loading floor; means for selecting a car at said floor and conditioning it for dispatch in one direction; a normally inoperative circuit for selecting a car, other than the car selected for dispatch in said one direction, and conditioning said other car for travel in the direction opposite said one direction; first means for actuating said circuit in response to a hall call from said loading floor; and second means for actuating said circuit in response to a hall call from the floor on the side of the loading floor opposite the direction of dispatch.

34. In a control system for a plurality of elevator cars serving a plurality of floors with a loading floor at an intermediate level, apparatus comprising: means for returning cars to said loading floor; means for selecting a car at said floor and conditioning it for dispatch in one direction; means for registering a hall call from a floor on the side of said loading floor opposite the direction of dispatch; secondary car selection means actuated by registration of said hall call for selecting a car at said loading floor other than a car selected for dispatch, to answer said hall call; and including a relay; first contact means associated with said relay for actuating the door mechanism of said second selected car; second contact means associated with said relay for actuating a loading floor indicator light associated with said second selected car.

References Cited in the file of this patent

UNITED STATES PATENTS

| | | |
|---|---|---|
| 2,759,564 | Borden | Aug. 21, 1956 |
| 2,761,528 | Glaser et al. | Sept. 4, 1956 |